(12) United States Patent
Baba et al.

(10) Patent No.: US 11,649,869 B2
(45) Date of Patent: May 16, 2023

(54) FRICTION MATERIAL COMPOSITION, FRICTION MATERIAL, AND FRICTION MEMBER

(71) Applicant: HITACHI CHEMICAL COMPANY, LTD., Tokyo (JP)

(72) Inventors: Kazuya Baba, Tokyo (JP); Teruyuki Nagayoshi, Tokyo (JP); Yuichi Fukuzawa, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 339 days.

(21) Appl. No.: 16/491,195

(22) PCT Filed: Mar. 6, 2017

(86) PCT No.: PCT/JP2017/008849
§ 371 (c)(1),
(2) Date: Sep. 5, 2019

(87) PCT Pub. No.: WO2018/163256
PCT Pub. Date: Sep. 13, 2018

(65) Prior Publication Data
US 2020/0032868 A1    Jan. 30, 2020

(51) Int. Cl.
*F16D 69/02* (2006.01)
*F16D 65/04* (2006.01)

(52) U.S. Cl.
CPC ........... *F16D 69/026* (2013.01); *F16D 65/04* (2013.01); *F16D 2200/0039* (2013.01); *F16D 2200/0065* (2013.01)

(58) Field of Classification Search
CPC ........... F16D 69/026; F16D 2200/0036; F16D 2200/0065; F16D 65/04; F16D 65/126; F16D 69/028; F16D 2069/002; F16D 2200/0052; F16D 2200/0069; C09K 3/149
See application file for complete search history.

(56) References Cited

U.S. PATENT DOCUMENTS

| 9,863,493 B2 * | 1/2018 | Kikudome | F16D 69/026 |
| 10,570,975 B2 * | 2/2020 | Baba | F16D 65/126 |
| 2002/0086159 A1 | 7/2002 | Horiya et al. | |
| 2013/0220746 A1 * | 8/2013 | Unno | F16D 65/092 188/251 A |
| 2013/0225720 A1 | 8/2013 | Kimura et al. | |
| 2013/0240310 A1 * | 9/2013 | Baba | F16D 69/028 188/251 A |
| 2014/0202805 A1 * | 7/2014 | Unno | F16D 69/026 188/251 A |
| 2014/0342899 A1 | 11/2014 | Itami et al. | |
| 2018/0106321 A1 * | 4/2018 | Matsuba | C01F 5/02 |
| 2018/0313420 A1 * | 11/2018 | Shimada | F16D 69/025 |

FOREIGN PATENT DOCUMENTS

| CN | 104471014 A | 3/2015 |
| JP | H03-28535 A | 2/1991 |
| JP | 06-017030 A | 1/1994 |
| JP | 2001-049242 A | 2/2001 |
| JP | 2002-138273 A | 5/2002 |
| JP | 2008-201930 A | 9/2008 |
| JP | 2013-076058 A | 4/2013 |
| JP | 2015-028176 A | 2/2015 |
| JP | 2016-050283 A | 4/2016 |
| JP | 2016-113505 A | 6/2016 |
| JP | 2016153440 A | 8/2016 |
| JP | 2017-002185 A | 1/2017 |
| JP | 2017-025286 A | 2/2017 |
| WO | 2017-014173 A1 | 1/2017 |

OTHER PUBLICATIONS

Translation of JP 2017002185 document obtained from website: https://worldwide.espacenet.com on Mar. 2, 2021.*
Translation of JP 2001049242 document obtained from website: https://worldwide.espacenet.com on Mar. 2, 2021.*

* cited by examiner

*Primary Examiner* — Pamela Rodriguez
(74) *Attorney, Agent, or Firm* — Fitch, Even, Tabin & Flannery, LLP

(57) ABSTRACT

There are provided a friction material composition containing no copper or having a reduced content of copper that can provide a friction material in which the stability of the friction coefficient after standing in a cold environment, the abrasion resistance, and the low rust fixation properties are excellent, and squeal (particularly low temperature squeal) is suppressed, and a friction material obtained by molding the friction material composition, and a friction member using the friction material. The friction material composition is specifically a friction material composition comprising a bonding material, an organic filler, an inorganic filler, and a fiber substrate, in which the friction material composition comprises no copper, or has a content of copper of less than 0.5% by mass in terms of a copper element even if comprising the copper, and comprises, as the organic filler, cashew particles to which a silicone resin adheres.

8 Claims, No Drawings

FRICTION MATERIAL COMPOSITION, FRICTION MATERIAL, AND FRICTION MEMBER

CROSS-REFERENCE TO RELATED APPLICATIONS

This application is a U.S. national phase application filed under 35 U.S.C. § 371 of International Application No. PCT/JP2017/008849, filed Mar. 6, 2017, designating the United States, which is hereby incorporated herein by reference in its entirety.

TECHNICAL FIELD

The present invention relates to a friction material composition, a friction material, and a friction member.

BACKGROUND ART

Generally, brakes mounted in automobiles and the like are broadly divided mainly into two groups, disk brakes and drum brakes. In a disk brake, a disk rotor rotating integrally with a wheel during running is sandwiched between brake pads, and the friction force generated at this time generates braking force. In a drum brake, for example, brake linings (also referred to as a brake shoe) are mounted inside a drum installed inside a wheel, and by pressing the brake linings from the inside to the outside, braking force is exhibited.

Friction materials are provided in the brake pads of a disk brake and the brake linings of a drum brake, and the friction materials produce friction with facing materials such as a disk rotor and a drum to convert the kinetic energy of automobiles or the like into thermal energy for braking.

The materials of friction materials used for brake pads and brake linings are classified into (1) semimetallic materials containing steel fibers as a fiber substrate in an amount of 30% by mass or more and less than 60% by mass based on the total amount of a friction material composition, (2) low steel materials comprising steel fibers in part of a fiber substrate and containing the steel fibers in an amount of less than 30% by mass based on the total amount of a friction material composition, and (3) NAO (Non-Asbestos-Organic) materials hardly comprising steel-based fibers such as steel fibers and stainless steel fibers as a fiber substrate. Among these, in NAO materials, the stability of the friction coefficient is excellent, the unpleasant noise, the vibration, and the like are reduced, and the low noise properties are excellent. Therefore, friction materials formed using the NAO materials are widely adopted in main regions other than Europe, for example, Japan, North America, South America, and Asia.

With the conversion of kinetic energy into thermal energy, some may be converted into vibration energy. In this case, the vibration energy generates vibration or squeal in braking, and therefore an unpleasant feeling is given to the user of an automobile or the like, and the salability of the friction materials decreases significantly. Therefore, not only are a high friction coefficient and the stability of the friction coefficient and abrasion resistance required of a friction material, but also the fact that squeal, vibration, and the like are less likely to occur is also required.

A general friction material comprises a bonding material, a fiber substrate, a metal powder, an inorganic filler, an organic filler, and the like, and comprises one or a combination of two or more of each in order to exhibit the properties. As the fiber substrate, organic fibers, inorganic fibers, metal fibers, or the like are used. Particularly, in order to improve the abrasion resistance, the stability of the friction coefficient after a thermal history, the strength of the friction material, and the crack resistance, fibers having a high content of copper, such as copper fibers and fibers of a copper alloy, are used as metal fibers. For example, PTL1 discloses a friction material having a content of copper fibers of 10 to 30% by weight and using a particular amount of a cashew resin in part of a friction-adjusting material. Comparative Example 1 and the like of the literature show that when the content of copper fibers is less than 10% by weight, the stability of the friction coefficient decreases, and the abrasion resistance decreases, and further an abnormal sound is likely to occur. In other words, it is shown that a friction material containing a cashew resin needs to contain 10 to 30% by weight of copper from the viewpoint of the stability of the friction coefficient, the abrasion resistance, and the suppression of abnormal sound occurrence.

But, it is suggested that with these friction materials containing copper or a copper alloy, copper is contained in a large amount in the abrasion powders generated by braking, and therefore it causes the contamination of rivers, lakes, seas, and the like. Laws limiting the amounts of copper components used in friction materials are enforced mainly in the United States, particularly California and Washington. Therefore, in order to provide a friction material that can be used in foreign countries including the United States, it is necessary to contain no copper or significantly reduce the content of copper, and the friction material containing copper proposed in PTL1 currently has low commercial value.

Accordingly, for the purpose of providing a friction material having a good friction coefficient, good abrasion resistance, and good rotor abrasion resistance though comprising no copper, copper alloy, or the like, a method in which a friction material contains magnesium oxide and graphite at 45 to 80% by volume o and the ratio between magnesium oxide and graphite is set at 1/1 to 4/1 is proposed (see PTL2).

In addition, under such a movement of limiting the amount of copper used, PTL3 proposes, as a technique for improving strength and abrasion resistance in a composition containing no copper, a friction material having a plurality of raised shapes and containing potassium titanate and biosoluble inorganic fibers.

CITATION LIST

Patent Literature

PTL1: JP 06-017030 A
PTL2: JP 2002-138273 A
PTL3: JP 2013-076058 A

SUMMARY OF INVENTION

Technical Problem

For example, automobile use environments are various from warm regions to cold regions, and automobile parts are required to exhibit the same properties even if there are such changes in use environments. The same applies to friction materials used for the braking of automobiles. For a friction material in which an organic filler, an inorganic filler, and a fiber substrate are bonded with a bonding material, when an automobile is allowed to stand in a cold area, the organic filler and the bonding material harden, and when an automobile is operated after standing in a cold environment, sudden fluctuations in the friction coefficient may occur, and squeal (the so-called low temperature squeal) may occur.

Recently, because of merits such as the improvement of convenience due to automatic control such as hill start aid, and the effective utilization of car interior space due to the conversion of a parking brake lever into a switch, electric parking brakes (EPB) spread rapidly. When a friction material is fixed to a friction facing material by rust formed at a friction interface while a vehicle is stationary, an abnormal sound is likely to occur, and the peeling of the surface of the friction material (rust peeling) is likely to occur, when the fixed friction material and friction facing material peel during the starting of the vehicle. Therefore, low rust fixation properties are required of a brake pad for the EPB.

Under such circumstances, with the friction materials described in PTL2 and PTL3, it is difficult to obtain friction materials in which the stability of the friction coefficient after standing in a cold environment, the abrasion resistance, and the low rust fixation properties are excellent, and squeal (particularly low temperature squeal) is suppressed. In addition, as described above, with a friction material containing no copper or having a reduced content of copper, in the first place, the stability of the friction coefficient and the abrasion resistance tend to decrease, and an abnormal sound tends to be likely to occur, and further the rust fixation properties also tend to decrease. Therefore, it is difficult to obtain a friction material in which the stability of the friction coefficient after standing in a cold environment, the abrasion resistance, and the low rust fixation properties are excellent, and squeal (particularly low temperature squeal) is suppressed, without containing copper.

Accordingly, it is an object of the present invention to provide a friction material composition containing no copper, or having a content of copper of less than 0.5% by mass in terms of a copper element even if comprising the copper that can provide a friction material in which the stability of the friction coefficient after standing in a cold environment, the abrasion resistance, and the low rust fixation properties are excellent, and squeal (particularly low temperature squeal) is suppressed, in a friction material, and to provide a friction material obtained by molding the friction material composition, and a friction member using the friction material.

Solution to Problem

The present inventors have studied diligently in order to achieve the above object, and as a result found that the above object can be achieved by a friction material composition containing, as an organic filler, cashew particles to which a silicone resin adheres, even if containing no copper or having a content of copper of less than 0.5% by mass in terms of a copper element, leading to the completion of the present invention. The present invention has been completed based on such findings.

The present invention relates to the following [1] to [8].
[1] A friction material composition comprising an organic filler, an inorganic filler, a fiber substrate, and a bonding material,
wherein the friction material composition comprises no copper, or has a content of copper of less than 0.5% by mass in terms of a copper element even if comprising the copper, and comprises, as the organic filler, cashew particles to which a silicone resin adheres.
[2] The friction material composition according to the above [1], wherein in the cashew particles to which the silicone resin adheres, an adhesion rate of the silicone resin is 0.5 to 45% by mass.
[3] The friction material composition according to the above [1] or [2], wherein in the cashew particles to which the silicone resin adheres, the adhesion rate of the silicone resin is 7 to 30% by mass.
[4] The friction material composition according to any one of the above [1] to [3], wherein a content of the cashew particles to which the silicone resin adheres is 0.5 to 15 parts by mass based on 100 parts by mass of the friction material composition.
[5] The friction material composition according to any one of the above [1] to [4], comprising no copper.
[6] A friction material obtained by molding the friction material composition according to any one of the above [1] to [5].
[7] A friction member wherein the friction material according to the above [6] is disposed on a back metal.
[8] A friction member wherein the friction material according to the above [6] is disposed on a back metal via an intermediate layer.

Advantageous Effects of Invention

It is possible to provide a friction material composition that can provide a friction material containing no copper or having a content of copper of less than 0.5% by mass in terms of a copper element in which the stability of the friction coefficient after standing in a cold environment, the abrasion resistance, and the low rust fixation properties are excellent, and squeal (particularly low temperature squeal) is suppressed, and a friction material obtained by molding the friction material composition, and a friction member using the friction material.

DESCRIPTION OF EMBODIMENTS

The present invention will be described in detail below. However, in the following embodiments, their components are not essential unless otherwise specified. The same applies to numerical values and their ranges, and they do not limit the present invention.

As used herein, a numerical value range represented using "to" includes the numerical values described before and after "to" as the minimum value and the maximum value respectively. For numerical value ranges described in stages herein, the upper limit value or the lower limit value described in one numerical value range may be replaced by the upper limit value or lower limit value of another numerical value range described in stages. For a numerical value range described herein, the upper limit value or lower limit value of the numerical value range may be replaced by a value shown in Examples. Further, as used herein, the content of each component in a friction material composition means, when a plurality of substances corresponding to each component are present, the total content of the plurality of substances present in the friction material composition unless otherwise noted.

[Friction Material Composition]

The present invention is a friction material composition containing an organic filler, an inorganic filler, a fiber substrate, and a bonding material,
in which the friction material composition comprises no copper, or has a content of copper of less than 0.5% by mass in terms of a copper element even if comprising the copper, and contains, as the organic filler, cashew particles to which a silicone resin adheres.

The friction material composition of the present invention preferably contains no copper. But, in a case where the friction material composition comprises copper, by setting the content of copper in the friction material composition at less than 0.5% by mass in terms of a copper element, the friction material composition can be one causing no contamination of rivers and the like even if released into the environment as an abrasion powder. The content of copper represents the content of the copper element (Cu) contained in copper, a copper alloy, and a copper compound in a fibrous or powdery form or the like, in the entire friction material composition.

The friction material composition of the present invention is classified into a NAO (Non-Asbestos-Organic) material and is the so-called non-asbestos friction material composition (a friction material composition containing no asbestos, or a friction material composition having an extremely slight content of asbestos even when containing asbestos). In the friction material composition of the present invention, the content of asbestos is 0.2% by mass or less, substantially 0% by mass.

First, the present inventors have repeated diligent studies on the cause of a sudden change in the friction coefficient of a friction material, and low temperature squeal that occurs when an automobile is operated after being allowed to stand in a cold environment, and inferred as follows. Rust forms at the interface between a transfer film formed by the transfer of a friction material composition to a disk rotor surface during braking and the disk rotor surface, and rust forms on the friction material dispersed in the transfer film, the iron derived from the abrasion powder from the disk rotor, or the like. When braking is performed after standing in a cold environment, rupture occurs from the rust formed at the interface between the disk rotor surface and the transfer film, and the transfer film falls off, which may be the cause. In other words, with a conventional friction material comprising copper in a large amount, copper is contained in a large amount in a transfer film, and therefore a disk rotor surface is coated with the copper in the transfer film, and the iron in the transfer film is also coated with the copper, and therefore rust is less likely to form at the interface between the disk rotor surface and the transfer film even in the case of standing in a cold environment. But, when a friction material comprises no copper, or has a content of copper as slight as less than 0.5% by mass even if it comprises the copper, the main components of a transfer film are the decomposition products of the titanate, the bonding material, and the organic filler, but the iron of the friction material dispersed in the transfer film is likely to rust, and rust is likely to form on the disk rotor surface in portions where the transfer film is thin, and therefore due to the rust, the above falling off of the transfer film may occur.

Accordingly, the present inventors have continued diligent studies on methods for suppressing such formation of rust, and as a result, by containing, as an organic filler, cashew particles to which a silicone resin adheres, the water repellency of a transfer film has increased, and as a result, the formation of rust at the interface between the surface of the disk rotor and the transfer film has been suppressed even after standing in a cold environment. Moreover, it has become clear that rust fixation in use as an electric parking brake (EPB) can also be suppressed, leading to the present invention.

In the present invention, in a test in accordance with SAE J2521, a sound of 75 dB or more is defined as "squeal".

The components of the friction material composition will be described in order below.

(Organic Filler)

The friction material composition of the present invention contains, as the organic filler, cashew particles to which a silicone resin adheres. The friction material composition of the present invention may contain another organic filler (including cashew particles to which a silicone resin does not adhere) together with the cashew particles to which the silicone resin adheres. However, from the viewpoint of making the stability of the friction coefficient after standing in a cold environment, the abrasion resistance, and the low rust fixation properties good and suppressing squeal (particularly low temperature squeal) in a friction material containing no copper or having a content of copper of less than 0.5% by mass in terms of a copper element (hereinafter simply referred to as the viewpoint of the effects of the present invention), the content of the cashew particles to which the silicone resin adheres should be preferably 40% by mass or more, more preferably 55% by mass or more, further preferably 80% by mass or more, particularly preferably 90% by mass or more, and most preferably substantially 100% by mass based on the total amount of the cashew particles.

The organic filler can exhibit a function as a friction-adjusting agent for improving the sound and vibration properties, abrasion resistance, and the like of the friction material. Here, in the present invention, the organic filler does not include one having a fibrous shape (for example, the organic fibers described later).

Particularly, in the present invention, by containing, as the organic filler, the cashew particles to which the silicone resin adheres, the stability of the friction coefficient after standing in a cold environment, the abrasion resistance, and the low rust fixation properties are excellent, and squeal (particularly low temperature squeal) is suppressed, in a friction material containing no copper or having a content of copper of less than 0.5% by mass in terms of a copper element.

Examples of the organic filler that the friction material composition contains include rubber components and melamine dust in addition to cashew particles. Examples of the rubber components include natural rubbers and synthetic rubbers. Examples of the synthetic rubbers include acrylonitrile-butadiene rubbers (NBR), acrylic rubbers, isoprene rubbers, polybutadiene rubbers (BR), styrene butadiene rubbers (SBR), silicone rubbers, and pulverized powders of tire tread rubbers. Among these, acrylonitrile-butadiene rubbers (NBR) are preferred from the viewpoint of the balance of heat resistance, flexibility, and production cost.

As the organic filler, cashew particles and a rubber component may be used in combination, or cashew particles coated with a rubber component may be used.

One organic filler may be used alone, or two or more organic fillers may be used in combination.

<Cashew Particles to Which Silicone Resin Adheres>

Cashew particles are obtained by pulverizing a cured product of cashew nutshell oil, and are also generally referred to as cashew dust.

Cashew particles are generally classified into a brown type, a brown-black type, a black type, and the like according to the type of the curing agent used for the curing reaction. For the cashew particles, by adjusting the molecular weight and the like, the heat resistance and the sound and vibration properties and further the film forming properties on a rotor that is the opposite material, and the like can be easily controlled. As the cashew particles, commercial products can be used. As the commercial products, for example, examples of the brown type include H-101 manufactured by Cashew Co., Ltd. and FF1043 manufactured by Tohoku Chemical Industries, Ltd. Examples of the brown-black type include H-9047 manufactured by Cashew Co., Ltd., FF1058 manufactured by Tohoku Chemical Industries, Ltd., and 6010 manufactured by Palmer International. Examples of the black type include H-201 manufactured by Cashew Co., Ltd., FF1080 and FF1090 manufactured by Tohoku Chemical Industries, Ltd., and 6025 manufactured by Palmer International.

One type of cashew particles may be used alone, or two or more types of cashew particles may be used in combination.

In the present invention, cashew particles to which a silicone resin adheres are used. The mechanism for obtaining the effects of the present invention by using such cashew particles is inferred as follows. First, a silicone resin has water repellency, and has the property of high heat resistance due to high decomposition temperature. By adhering a silicone resin to cashew particles, the positions of the cashew particles and the position of the silicone resin in the friction material can be made close to each other. When the cashew particles thermally decomposed by frictional heat during braking transfer to a disk rotor surface and spread to form a transfer film, the silicone resin transfers to the disk rotor surface and spreads together with the thermally decomposed cashew particles, and thus the silicone resin having water repellency is generally uniformly dispersed in the transfer film without being thermally decomposed, and water repellency is provided to the transfer film. Therefore, the formation of rust is efficiently suppressed. As a result, although the friction material contains no copper or has a content of copper of less than 0.5% by mass in terms of a copper element, the stability of the friction coefficient after standing in a cold environment, the abrasion resistance, and the low rust fixation properties are excellent, and further, squeal (particularly low temperature squeal) is suppressed.

The cashew particles to which the silicone resin adheres may be cashew particles coated with the rubber component to which a silicone resin is further adhered.

An advantage of the technique of using the cashew particles to which the silicone resin adheres is that decreases in the strength and abrasion resistance of the friction material do not occur because the decomposition of aramid fibers, which may be contained in the friction material, does not occur, unlike the technique of containing calcium hydroxide in a friction material to increase the pH of the friction material to suppress the formation of rust.

In order to obtain the above effect, the position of the silicone resin and the positions of the cashew particles in the friction material are preferably closer to each other, and the silicone resin and the cashew particles are more preferably present at substantially the same position. From this, as the form of the cashew particles to which the silicone resin adheres, a form in which the cashew particles are "coated" with the silicone resin is preferred. A state in which the surfaces of the cashew particles are completely coated with the silicone resin and are not exposed is preferred, but the coating may be partially incomplete.

As the silicone resin adhering to the cashew particles, general silicone resins can be used. From the viewpoint of the ease of coating the cashew particles, the silicone resin is preferably a liquid type having a kinematic viscosity of about 5,000 to 100,000 cS because the workability is good. From the same viewpoint, the kinematic viscosity of the silicone resin is more preferably 7,000 to 50,000, further preferably 7,000 to 30,000, particularly preferably 7,000 to 20,000, and most preferably 8,000 to 15,000. Examples of the silicone resin include SH200 FLUID series, for example, SH200 FLUID 10,000 CS, manufactured by Dow Corning Toray Co., Ltd.

The method for adhering the silicone resin to the cashew particles is not particularly limited, and, for example, the cashew particles can be coated with the silicone resin by kneading the cashew particles and the silicone resin using a pressure kneader or the like. A commercial product of cashew particles coated with a silicone resin can also be used as it is. Examples of the commercial product of cashew particles coated with a silicone resin include FF5290 and CD337 manufactured by Tohoku Chemical Industries, Ltd., H9594 manufactured by Cashew Co., Ltd., and PH0001 manufactured by Palmer International.

In the cashew particles to which the silicone resin adheres, the adhesion rate of the silicone resin is preferably 0.5 to 45% by mass, more preferably 0.5 to 30% by mass, further preferably 3 to 25% by mass, particularly preferably 7 to 25% by mass, and most preferably 7 to 20% by mass, and 7 to 30% by mass is also preferred. By setting the adhesion rate of the silicone resin on the cashew particles in the above ranges, the effects of the present invention are sufficiently exhibited, and the segregation of the cashew particles in the friction material composition and a decrease in sound and vibration properties tend to be prevented.

The content of the cashew particles to which the silicone resin adheres is preferably 0.5 to 15 parts by mass, more preferably 2 to 10 parts by mass, and further preferably 3 to 8 parts by mass based on 100 parts by mass of the friction material composition. By setting the content at 0.5 parts by mass or more, the water repellency of the friction material and a rotor surface is improved to sufficiently obtain the effects of the present invention, and further, moderate flexibility can be provided to the friction material, and therefore the sound and vibration properties tend to be improved. By setting the content at 15 parts by mass or less, decreases in heat resistance and crack resistance tend to be prevented.

The total content of the organic filler in the friction material composition of the present invention is preferably 2 to 20 parts by mass, more preferably 3 to 15 parts by mass, further preferably 4 to 12 parts by mass, and particularly preferably 7 to 10 parts by mass based on 100 parts by mass of the friction material composition. By setting the total content of the organic filler in the above ranges, the friction material hardens to cause the deterioration of the sound and vibration performance, such as squeal, tends to be avoided, and the deterioration of the heat resistance, and the strength decrease due to the thermal history tend to be avoided.

When the friction material composition of the present invention contains both cashew dust (including both cashew dust to which a silicone resin adheres and cashew dust to which a silicone resin does not adhere) and a rubber component, the mass ratio between the cashew dust and the rubber component (cashew dust/rubber component) is preferably 1/4 to 10/1, more preferably 1/3 to 9/1, further preferably 1/2 to 8/1, and most preferably 1/2 to 5/1 from the viewpoint of flexibility and heat resistance.

(Inorganic Filler)

The inorganic filler can exhibit a function as a friction-adjusting material for avoiding the deterioration of the heat resistance, the abrasion resistance, the stability of the friction coefficient, and the like of the friction material. Here, in the present invention, the inorganic filler does not include one having a fibrous shape (for example, the inorganic fibers described later).

The inorganic filler is not particularly limited as long as it is an inorganic filler usually used in a friction material. Examples of the inorganic filler include metal sulfides such as antimony trisulfide, tin sulfide, molybdenum disulfide, bismuth sulfide, and zinc sulfide; titanates such as potassium titanate, lithium potassium titanate, sodium titanate, and magnesium potassium titanate; mica, graphite, coke, calcium hydroxide, calcium oxide, sodium carbonate, calcium carbonate, magnesium carbonate, barium sulfate, dolomite, coke, mica, vermiculite, calcium sulfate, granular potassium titanate, plate-like potassium titanate, talc, clay, zeolite, zirconium silicate, zirconium oxide, mullite, chromite, titanium oxide, magnesium oxide, silica, triiron tetroxide, zinc oxide, garnet, α-alumina, γ-alumina, and silicon carbide; and metal powders such as iron powders, cast iron powders, aluminum powders, nickel powders, tin powders, zinc powders, and alloy powders containing at least one of the metals. Among these, at least one selected from the group consisting of metal sulfides, titanates, mica, graphite, calcium hydroxide, barium sulfate, and zirconium oxide is preferred, and it is also preferred to use metal sulfides, titanates, mica, graphite, calcium hydroxide, barium sulfate, and zirconium oxide in combination.

One inorganic filler may be used alone, or two or more inorganic fillers may be used in combination.

Among the above inorganic fillers, calcium hydroxide, calcium carbonate, and zinc oxide are preferred from the viewpoint of suppressing rust formation on the friction material. However, calcium hydroxide increases the pH of the friction material, and the aramid fibers tend to decompose easily. Therefore, when calcium hydroxide is used, attention is preferably paid to the amount of calcium hydroxide used, so that the pH is not too high. For example, when calcium hydroxide is contained as the inorganic filler, the content of calcium hydroxide is preferably 0.5 to 10 parts by mass, more preferably 1 to 8 parts by mass, and further preferably 2 to 6 parts by mass based on 100 parts by mass of the friction material composition.

The content of the inorganic filler in the friction material composition of the present invention is preferably 30 to 80 parts by mass, more preferably 40 to 78 parts by mass, further preferably 50 to 75 parts by mass, and particularly preferably 60 to 75 parts by mass based on 100 parts by mass of the friction material composition. By setting the content of the inorganic filler in the above ranges, the deterioration of the heat resistance tends to be avoided.

(Fiber Substrate)

The fiber substrate exhibits a reinforcing action in the friction material. Examples of the fiber substrate include inorganic fibers and organic fibers.

One fiber substrate may be used alone, or two or more fiber substrates may be used in combination. Inorganic fibers and organic fibers are preferably used in combination.

Examples of the inorganic fibers include metal fibers, mineral fibers, carbon fibers, ceramic fibers, biodegradable ceramic fibers, glass fibers, rock wool, potassium titanate fibers, silicate fibers, flame-resistant fibers, and calcium silicate fibers. Examples of the calcium silicate fibers include fibrous wollastonite and fibrous Zonolite.

One type of inorganic fibers may be used alone, or two or more types of inorganic fibers may be used in combination. As the inorganic fibers, metal fibers and mineral fibers are preferred, and mineral fibers are more preferred.

Examples of the metal fibers include fibers in the form of a metal simple substance or alloy of aluminum, iron, zinc, tin, titanium, nickel, magnesium, or the like, and fibers comprising a metal such as cast iron as a main component. Examples of the fibers in the form of an alloy (alloy fibers) include iron alloy fibers and aluminum alloy fibers. One type of metal fibers may be used alone, or two or more types of metal fibers may be used in combination.

From the viewpoint of improving the crack resistance and the abrasion resistance, generally, copper fibers or copper alloy fibers are preferred, but when fibers of copper or a copper alloy are contained, there is the problem of environmental pollution as described above. Therefore, in the present invention, the content of copper in the friction material composition is less than 0.5% by mass, preferably 0.3% by mass or less, and more preferably 0.1% by mass or less in terms of a copper element, and further preferably, the friction material composition comprises substantially no copper. Examples of the copper alloy fibers include copper fibers, brass fibers, and bronze fibers.

The mineral fibers are artificial inorganic fibers obtained by melt spinning using blast furnace slag such as slag wool, basalt such as basalt fibers, another natural rock, or the like as a main component. Examples of the mineral fibers include mineral fibers containing $SiO_2$, $Al_2O_3$, CaO, MgO, FeO, $Na_2O$, or the like, or mineral fibers containing one or two or more of these compounds. As the mineral fibers, mineral fibers comprising an aluminum element are preferred, mineral fibers containing $Al_2O_3$ are more preferred, and mineral fibers containing $Al_2O_3$ and $SiO_2$ are further preferred.

The adhesive strength tends to decrease as the average fiber length of the mineral fibers contained in the friction material composition increases. Therefore, the average fiber length of the mineral fibers is preferably 500 μm or less, more preferably 100 to 400 μm, and further preferably 120 to 340 μm. Here, the average fiber length represents the average value obtained by selecting 50 mineral fibers used as a friction material composition raw material at random, and measuring the fiber length by an optical microscope.

The average fiber diameter of the mineral fibers is not particularly limited but is usually 1 to 20 μm and may be 2 to 15 μm.

The mineral fibers are preferably biosoluble from the viewpoint of harmfulness to the human body. The biosoluble mineral fibers here are mineral fibers characterized by being partially decomposed and eliminated from the body in a short time even when taken into the human body. Specifically, the biosoluble mineral fibers refers to fibers in which for the chemical composition, the total amount of alkali oxides and alkaline earth oxides (the total amount of oxides of sodium, potassium, calcium, magnesium, and barium) is 18% by mass or more and which satisfy the following: the mass half-life of fibers of 20 μm or more is within 40 days in a short-term biopersistence test by inhalation; or there is no evidence of excess carcinogenicity in an intraperitoneal test; or there is no relevant pathogenicity or tumorigenesis in a long-term inhalation test (Nota Q of EU Directive 97/69/EC (carcinogenicity exemption)). Examples of such biodegradable mineral fibers include $SiO_2$—$Al_2O_3$—CaO—MgO—FeO(—$K_2O$—$Na_2O$)— based fibers and include mineral fibers containing, in any combination, at least two selected from $SiO_2$, $Al_2O_3$, CaO, MgO, FeO, $K_2O$, $Na_2O$, and the like. Examples of commercial products include Roxul series manufactured by LAPINUS FIBERS B.V. "Roxul" comprises $SiO_2$, $Al_2O_3$, CaO, MgO, FeO, and the like and may further comprise at least one selected from the group consisting of $K_2O$ and $Na_2O$.

Examples of the carbon fibers include flame-resistant fibers, pitch-based carbon fibers, PAN-based carbon fibers, and activated carbon fibers. One type of carbon fibers may be used alone, or two or more types of carbon fibers may be used in combination.

Examples of the organic fibers include hemp, cotton, aramid fibers, cellulose fibers, acrylic fibers, and phenolic resin fibers (having a crosslinked structure). One type of organic fibers may be used alone, or two or more types of organic fibers may be used in combination. As the organic fibers, aramid fibers are preferred from the viewpoint of heat resistance. The organic fibers may be fibrillated from the viewpoint of improving the strength of the friction material, and using fibrillated aramid fibers is also preferred.

The content of the fiber substrate in the friction material composition of the present invention is preferably 5 to 40 parts by mass, more preferably 5 to 20 parts by mass, and further preferably 5 to 15 parts by mass based on 100 parts by mass of the friction material composition. By setting the content of the fiber substrate in the above ranges, optimal porosity as the friction material tends to be obtained, squeal tends to be prevented, appropriate material strength tends to be obtained, the abrasion resistance tends to be improved, and further the moldability tends to be improved.

(Bonding Material)

The bonding material has the function of bonding and integrating the organic filler, the inorganic filler, the fiber substrate, and the like contained in the friction material composition, to provide a predetermined shape and strength. The bonding material contained in the friction material composition of the present invention is not particularly limited, and thermosetting resins generally used as the bonding materials of friction materials can be used.

Examples of the thermosetting resins include phenolic resins, modified phenolic resins, epoxy resins, polyimide resins, and melamine resins. Here, examples of the modified phenolic resins include acrylic-modified phenolic resins, silicone-modified phenolic resins, cashew-modified phenolic resins, epoxy-modified phenolic resins, and alkylbenzene-modified phenolic resins. Particularly, phenolic resins, acrylic-modified phenolic resins, silicone-modified phenolic resins, and alkylbenzene-modified phenolic resins are preferably used because good heat resistance, good moldability, and a good friction coefficient are provided.

One thermosetting resin may be used alone, or two or more thermosetting resins may be used in combination.

The content of the bonding material in the friction material composition of the present invention is preferably 5 to 20 parts by mass, more preferably 5 to 14 parts by mass, and further preferably 5 to 10 parts by mass based on 100 parts by mass of the friction material composition. By setting the content of the bonding material in the above ranges, a decrease in the strength of the friction material can be further suppressed, and it is possible to further suppress the deterioration of the sound and vibration properties, such as squeal, due to the fact that the porosity of the friction material decreases, the friction material hardens, and the vibration damping properties decrease.

(Other Materials)

In addition to the organic filler, the inorganic filler, the fiber substrate, and the bonding material, other materials can be blended into the friction material composition of the present invention as needed.

As other materials, for example, an organic additive such as a fluorine-based polymer such as polytetrafluoroethylene (PTFE) can be blended from the viewpoint of abrasion resistance.

When the friction material composition of the present invention contains the above other materials, their content is preferably 20 parts by mass or less, more preferably 10 parts by mass or less, and further preferably 5 parts by mass or less based on 100 parts by mass of the total amount of the organic filler, the inorganic filler, the fiber substrate, and the bonding material. The friction material composition need not contain other materials.

[Friction Material]

The friction material of the present invention is obtained by molding the friction material composition and more specifically obtained by thermally molding and thermally curing the friction material composition. The friction material of the present invention is a friction material in which an organic filler, an inorganic filler, and a fiber substrate are bonded with a bonding material, and comprises no copper or has a content of copper of less than 0.5% by mass in terms of a copper element. The friction material of the present invention can be used as a friction material for a disk brake pad of an automobile or the like, or a friction material for a brake lining of an automobile or the like. The friction material of the present invention can also be used as a friction material for a clutch facing, an electromagnetic brake, a holding brake, or the like by subjecting the friction material composition of the present invention to steps such as molding into an intended shape, processing, and affixation.

In the friction material of the present invention, the stability of the friction coefficient after standing in a cold environment, the abrasion resistance, and the low rust fixation properties are excellent, and squeal (particularly low temperature squeal) is suppressed. The friction material of the present invention is preferred particularly as an automobile friction material.

The friction material of the present invention can be produced by molding the friction material composition of the present invention by a generally used method and is preferably produced by hot press molding. Particularly, the friction material is produced by mixing the friction material composition of the present invention using a mixing machine such as a Loedige mixer, a pressure kneader, or an EIRICH mixer, premolding the obtained mixture in a molding die, then molding the obtained premolded material, for example, under the conditions of a molding temperature of 140 to 160° C. and a molding pressure of 15 to 50 MPa for 4 to 10 minutes, and heat-treating the obtained molded material, for example, at 180 to 250° C. for 2 to 10 hours. Painting, scorching treatment, and polishing treatment may be performed as needed.

[Friction Member]

Further, the present invention provides a friction member in which the friction material is formed so as to form a friction surface, by using the friction material. Specific examples of the friction member of the present invention include (1) a friction member composed of only the friction material, (2) a friction member in which the friction material is disposed on a back metal, and (3) a friction member in which the friction material is disposed on a back metal via intermediate layers such as a primer layer and an adhesive layer.

The above back metal is one usually used in a friction member for the improvement of the mechanical strength of the friction member, and as the material, metals, fiber-reinforced plastics, or the like can be used. Examples of the back metal include iron, stainless steel, inorganic fiber-reinforced plastics, and carbon fiber-reinforced plastics. The primer layer and the adhesive layer should be those usually used for a friction member such as a brake shoe.

With the friction material composition and the friction material of the present invention, the stability of the friction coefficient after standing in a cold environment, the abrasion resistance, and the low rust fixation properties are excellent, and squeal (particularly low temperature squeal) is suppressed, and therefore the friction material composition and the friction material of the present invention are useful as the "overlay material" of the friction member. Further, the friction material composition and the friction material of the present invention provide high crack resistance as the friction material and therefore can also be molded and used as the "underlay material" of the friction member.

Here, the "overlay material" is the friction material forming the friction surface of the friction member, and the "underlay material" is a layer interposed between the friction material forming the friction surface of the friction member and the back metal and intended to improve the shear strength around the adhesion portion between the friction material and the back metal and the crack resistance.

Examples

The present invention will be described in more detail below by Examples, but the present invention is not limited in any way by these examples.

The friction material samples of the Examples and Comparative Examples were evaluated according to the following evaluation methods.

[Evaluation Methods]
(1) Evaluation of Stability of Friction Coefficient after Standing in Cold Environment The friction coefficients were measured in accordance with the effectiveness tests based on "JASO C406", a standard by the Society of Automotive Engineers of Japan, Inc. Further, in order to evaluate the stability of the friction coefficient before and after standing in a cold environment, the braking tests under the conditions shown in the following Table 1 were carried out after the completion of the second effectiveness test.

C: The rate of change is 100%±11% or more, which is inappropriate.

(2) Evaluation of Abrasion Resistance

The abrasion resistance was measured in accordance with "JASO C427", a standard by the Society of Automotive Engineers of Japan, Inc., and the amounts of abrasion (unit: mm) of a friction material corresponding to 1,000 brakings at brake temperatures of 100° C. and 300° C. were measured.

(3) Evaluation of Rust Fixation Properties

A rust fixation test was performed in accordance with JIS D4414 (Test procedure of seizure to ferrous mating surface due to corrosion), and the rust fixation force was evaluated according to the following criteria. When the evaluation of the rust fixation force is A, the rust fixation properties are best, followed by B.

A: The rust fixation force is less than 50 N, which is extremely good.
B: The rust fixation force is 50 N or more and less than 100 N, which is good.
C: The rust fixation force is 100 N or more, which is inappropriate.

After the above rust fixation test, whether the surface of the friction material peeled and transferred to the rotor surface was checked and evaluated as rust peeling. One in which no rust peeling occurred was evaluated as a, one in which rust peeling occurred was evaluated as b, and the pass mark was a. When the evaluation of rust peeling is a, the rust fixation properties are excellent.

(4) Evaluation of Squeal Performance

For the evaluation of squeal performance, a test was carried out in accordance with SAE J2521 (Disc brake Dynamometer Squeal Noise Matrix), and the squeal performance was evaluated according to the following evaluation criteria. In this test, a sound of 75 dB or more was defined as squeal.

A: The squeal occurrence rate is less than 5%, the squeal performance is extremely good, and the low temperature squeal is also reduced.

TABLE 1

| Test order | Test item | Braking initial speed (km/h) | Braking final speed (km/h) | Rotor temperature before braking (° C.) | Braking liquid pressure (MPa) | Number of Brakings | Environmental conditions | | Loading conditions |
|---|---|---|---|---|---|---|---|---|---|
| | | | | | | | Temperature (° C.) | Relative humidity (%) | |
| 1 | Effectiveness before standing (baseline) | 10 | 0.5 | 15 | 1 | 5 | 5 | 40 | Constant volume loading |
| 2 | Standing in cold environment for 3 hours | — | — | — | — | — | −5 | — | Constant volume loading |
| 3 | Effectiveness after standing | 10 | 0.5 | — | 1 | 5 | −5 | — | Constant volume loading |

The stability of the friction coefficient was calculated from the rate of change of the average value of friction coefficients obtained by five brakings, before and after standing in a cold environment (=average effectiveness after standing/average effectiveness before standing), and evaluated according to the following evaluation criteria:
A: The rate of change is 100%±within 5%, which is extremely good.
B: The rate of change is 100%±within 10%, which is good.

B: The squeal occurrence rate is 5% or more and less than 10%, and the squeal performance is good.
C: The squeal occurrence rate is 10% or more, and the low temperature squeal cannot be suppressed.

For all the evaluation of the stability of the friction coefficient in accordance with JASO C406, the measurement of abrasion resistance in accordance with JASO C427, and the evaluation of squeal performance in accordance with SAE J2521 described above, the evaluation was performed at an inertia of 75 kgf·m$^2$ using a dynamometer. They were carried out using a ventilated disk rotor (manufactured by KIRIU CORPORATION, material: FC190) and a general pin-sliding collet type caliper.

[Fabrication of Disk Brake Pads]

In the fabrication of disk brake pads, the following components of friction material compositions were provided. The components described in Tables 2 and 3 are the same as the following:

(Bonding Material)
Phenolic resin: manufactured by Hitachi Chemical Company, Ltd. (trade name: PR-1950W)

(Organic Fillers)
Cashew particles: manufactured by Tohoku Chemical Industries, Ltd. (trade name: FF5290: amount of silicone adhering: 5% by mass)
Cashew particles: manufactured by Tohoku Chemical Industries, Ltd. (trade name: CD337: amount of silicone adhering: 10% by mass)
Cashew particles: sample A (FF1058 coated with SH200: amount of silicone adhering: 1% by mass)
Cashew particles: sample B (FF1058 coated with SH200: amount of silicone adhering: 29% by mass)
Cashew particles: sample C (FF1058 coated with SH200: amount of silicone adhering: 35% by mass)
Cashew particles: manufactured by Tohoku Chemical Industries, Ltd. (trade name: FF1058: amount of silicone adhering: 0% by mass)
Liquid silicone resin: manufactured by Dow Corning Toray Co., Ltd. (trade name: SH200 FLUID 10,000 CS)
NBR powder: manufactured by Bayer (trade name: Baymod NXL 38.20, average particle diameter: 70 μm)

(Inorganic Fillers)
Barium sulfate: manufactured by Takehara Kagaku Kogyo Co., Ltd. (trade name: W-10)
Mica: manufactured by Imerys Specialities Japan Co., Ltd. (trade name: Suzorite 200-S)
Graphite: manufactured by TIMCAL (trade name: KS15)
Tin sulfide: manufactured by TRIBOTECC (trade name: Stannolube)
Antimony trisulfide: manufactured by TRIBOTECC (trade name: DBPC 2004)
Potassium titanate: manufactured by TOHO TITANIUM CO., LTD. (trade name: TOFIX-S)
Zirconium oxide: manufactured by DAIICHI KIGENSO KAGAKU KOGYO CO., LTD. (trade name: BR-QZ)
Calcium hydroxide: manufactured by Chichibu Lime Industry Co., Ltd (trade name: SA149)

(Fiber Substrates)
Aramid fibers (organic fibers): manufactured by DU PONT-TORAY CO., LTD. (trade name: Kevlar 1F538), fibrillated aramid fibers
Iron fibers (metal fibers): manufactured by GMT (trade name: #0)
Copper fibers (metal fibers): manufactured by Sunny Metal (trade name: SCA-1070)
Mineral fibers (inorganic fibers): manufactured by LAPINUS FIBERS B.V (trade name: RB220ELS Roxul 1000), average fiber length: 230±50 μm Examples 1 to 9, Reference Example 1, and Comparative Examples 1 to 2

Components were mixed in amounts used (unit: parts by mass) as described in Table 2 or 3 to obtain a friction material composition. This friction material composition was mixed by a Loedige mixer (manufactured by MATSUBO Corporation, trade name: Loedige Mixer M20), the obtained mixture was premolded by a molding press "50 ton press" (manufactured by Oji Machine Co., Ltd.), and the obtained premolded material was hot press-molded together with a back metal under the conditions of a molding temperature of 145° C. and a molding pressure of 30 MPa for 5 minutes using a molding press (manufactured by SANKI SEIKO CO., LTD.). The obtained molded article was heat-treated at 200° C. for 5 hours, polished using a rotary polishing machine, and subjected to scorching treatment at 520° C. for 5 minutes to obtain a disk brake pad having a friction material and a back metal (thickness of friction material: 11 mm, projected area of friction material: 52 cm$^2$). The friction material of the obtained disk brake pad was evaluated according to the evaluation methods. The results are shown together in Table 2 and Table 3.

TABLE 2

| | | | | | Examples | | | | | |
| --- | --- | --- | --- | --- | --- | --- | --- | --- | --- | --- |
| | | | | | 1 | 2 | 3 | 4 | 5 | 6 |
| Friction material compositions (parts by mass) | Bonding material | | Phenolic resin | | 8 | 8 | 8 | 8 | 8 | 8 |
| | Organic fillers | Cashew particles | FF5290 (silicone resin adhesion rate: 5% by mass) | | 6 | — | — | — | — | — |
| | | | CD337 (silicone resin adhesion rate: 10% by mass) | | — | 6 | — | — | — | 2.5 |
| | | | Sample A (silicone resin adhesion rate: 1% by mass) | | — | — | 6 | — | — | — |
| | | | Sample B (silicone resin adhesion rate: 29% by mass) | | — | — | — | 6 | — | — |
| | | | Sample C (silicone resin adhesion rate: 35% by mass) | | — | — | — | — | 6 | — |
| | | | FF1058 (silicone resin adhesion rate: 0% by mass) | | — | — | — | — | — | — |
| | | | NBR powder | | 2 | 2 | 2 | 2 | 2 | 5 |
| | Inorganic fillers | | Barium sulfate | | 18 | 18 | 18 | 18 | 18 | 18.5 |
| | | | Mica | | 4 | 4 | 4 | 4 | 4 | 4 |

TABLE 2-continued

|  |  |  | Examples | | | | | |
| --- | --- | --- | --- | --- | --- | --- | --- | --- |
|  |  |  | 1 | 2 | 3 | 4 | 5 | 6 |
|  |  | Graphite | 4.5 | 4.5 | 4.5 | 4.5 | 4.5 | 4.5 |
|  |  | Tin sulfide | 2 | 2 | 2 | 2 | 2 | 2 |
|  |  | Antimony trisulfide | 1.5 | 1.5 | 1.5 | 1.5 | 1.5 | 1.5 |
|  |  | Potassium titanate | 20 | 20 | 20 | 20 | 20 | 20 |
|  |  | Zirconium oxide | 20 | 20 | 20 | 20 | 20 | 20 |
|  |  | Calcium hydroxide | 4 | 4 | 4 | 4 | 4 | 4 |
| Fiber substrate |  | Aramid fibers | 3 | 3 | 3 | 3 | 3 | 3 |
|  |  | Copper fibers | — | — | — | — | — | — |
|  |  | Iron fibers | — | — | — | — | — | — |
|  |  | Mineral fibers | 7 | 7 | 7 | 7 | 7 | 7 |
| Content of copper (% by mass) |  |  | 0 | 0 | 0 | 0 | 0 | 0 |
| (1) Stability of friction coefficient |  |  | B | A | A | A | B | A |
| (2) Abrasion resistance (mm) | 100° C. |  | 0.07 | 0.10 | 0.12 | 0.13 | 0.16 | 0.16 |
|  | 300° C. |  | 0.90 | 0.75 | 0.87 | 0.80 | 0.71 | 0.80 |
| (3) Rust fixation properties | Rust fixation force |  | A | A | B | A | A | B |
|  | Rust peeling |  | a | a | b | a | a | b |
| (4) Squeal performance |  |  | B | A | A | A | A | A |

TABLE 3

|  |  |  |  | Examples | | | Reference Example | Comparative Examples | |
| --- | --- | --- | --- | --- | --- | --- | --- | --- | --- |
|  |  |  |  | 7 | 8 | 9 | 1 | 1 | 2 |
| Friction material compositions (parts by mass) | Bonding material | | Phenolic resin | 8 | 8 | 8 | 8 | 8 | 8 |
|  | Organic fillers | Cashew particles | FF5290 (silicone resin adhesion rate: 5% by mass) | — | — | — | — | — | — |
|  |  |  | CD337 (silicone resin adhesion rate: 10% by mass) | 9 | 1 | 12 | — | — | — |
|  |  |  | Sample A (silicone resin adhesion rate: 1% by mass) | — | — | — | — | — | — |
|  |  |  | Sample B (silicone resin adhesion rate: 29% by mass) | — | — | — | — | — | — |
|  |  |  | Sample C (silicone resin adhesion rate: 35% by mass) | — | — | — | — | — | — |
|  |  |  | FF1058 (silicone resin adhesion rate: 0% by mass) | — | — | — | 6 | 6 | 6 |
|  |  |  | NBR powder | 1 | 5 | 1 | 2 | 2 | 2 |
|  | Inorganic fillers |  | Barium sulfate | 16 | 20 | 13 | 8 | 8 | 18 |
|  |  |  | Mica | 4 | 4 | 4 | 4 | 4 | 4 |
|  |  |  | Graphite | 4.5 | 4.5 | 4.5 | 4.5 | 4.5 | 4.5 |
|  |  |  | Tin sulfide | 2 | 2 | 2 | 2 | 2 | 2 |
|  |  |  | Antimony trisulfide | 1.5 | 1.5 | 1.5 | 1.5 | 1.5 | 1.5 |
|  |  |  | Potassium titanate | 20 | 20 | 20 | 20 | 20 | 20 |
|  |  |  | Zirconium oxide | 20 | 20 | 20 | 20 | 20 | 20 |
|  |  |  | Calcium hydroxide | 4 | 4 | 4 | 4 | 4 | 4 |
|  | Fiber substrate |  | Aramid fibers | 3 | 3 | 3 | 3 | 3 | 3 |
|  |  |  | Copper fibers | — | — | — | 10 | — | — |
|  |  |  | Iron fibers | — | — | — | — | 10 | — |
|  |  |  | Mineral fibers | 7 | 7 | 7 | 7 | 7 | 7 |
| Content of copper (% by mass) |  |  |  | 0 | 0 | 0 | 10 | 0 | 0 |
| (1) Stability of friction coefficient |  |  |  | A | A | B | B | C | C |
| (2) Abrasion resistance (mm) | 100° C. |  |  | 0.11 | 0.17 | 0.13 | 0.13 | 0.33 | 0.12 |
|  | 300° C. |  |  | 0.98 | 0.90 | 1.08 | 0.85 | 2.11 | 0.90 |
| (3) Rust fixation properties | Rust fixation force |  |  | A | B | A | B | C | C |
|  | Rust peeling |  |  | a | b | a | b | b | b |
| (4) Squeal performance |  |  |  | A | B | B | B | C | C |

The friction material of Reference Example 1 is a conventional friction material containing 10% by mass of copper. In contrast to this, although containing no copper, the friction materials of Examples 1 to 9 exhibit properties equal to or more than those of the friction material of Reference Example 1.

On the other hand, for the friction materials of Comparative Example 1 and Comparative Example 2 containing no copper but containing no cashew particles to which a silicone resin adheres, the friction coefficient is not stable, low temperature squeal occurs, and further, rust fixation occurs. From these results, it was confirmed that even if a friction material containing cashew particles to which a silicone resin adheres contained no copper, the stability of the friction coefficient after standing in a cold environment, the abrasion resistance, and the low rust fixation properties were excellent, and squeal (particularly low temperature squeal) was suppressed.

INDUSTRIAL APPLICABILITY

With the friction material composition and the friction material of the present invention, no copper is contained or the amount of copper is extremely slight, even if copper is contained, in the abrasion powder produced during braking, and therefore the environmental pollution is small. The stability of the friction coefficient is maintained even after standing in a cold environment, and squeal (particularly low temperature squeal) is suppressed. Rust fixation is also suppressed in use as an electric parking brake (EPB). Therefore, the friction material composition and the friction material of the present invention can be adapted to a wide range of environments from warm regions to cold regions and are preferred as an automobile friction material.

The invention claimed is:

1. A friction material composition comprising an organic filler, an inorganic filler, a fiber substrate, and a bonding material, wherein the friction material composition comprises no copper, or has a content of copper of less than 0.5% by mass in terms of a copper element even if comprising the copper, the friction material composition comprises, as the organic filler, cashew particles to which a silicone resin adheres, and in the cashew particles to which the silicone resin adheres, an adhesion rate of the silicone resin is 29 to 45% by mass of the friction material composition.

2. The friction material composition according to claim 1, wherein a content of the cashew particles to which the silicone resin adheres is 0.5 to 15 parts by mass based on 100 parts by mass of the friction material composition.

3. The friction material composition according to claim 1, comprising no copper.

4. The friction material composition according to claim 3, wherein a content of the cashew particles to which the silicone resin adheres is 3 to 9% by mass of the friction material composition.

5. A friction material obtained by molding the friction material composition according to claim 1.

6. A friction member wherein the friction material according to claim 5 is disposed on a back metal.

7. A friction member wherein the friction material according to claim 5 is disposed on a back metal via an intermediate layer.

8. The friction material composition according to claim 1, wherein a content of the cashew particles to which the silicone resin adheres is 3 to 9% by mass of the friction material composition.

* * * * *